United States Patent
Inamoto et al.

(10) Patent No.: US 11,005,112 B2
(45) Date of Patent: May 11, 2021

(54) FUEL CELL SYSTEM AND FUEL CELL VEHICLE

(71) Applicant: HONDA MOTOR CO., LTD., Tokyo (JP)

(72) Inventors: Masaoki Inamoto, Wako (JP); Kuniaki Ojima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 136 days.

(21) Appl. No.: 16/255,861

(22) Filed: Jan. 24, 2019

(65) Prior Publication Data
US 2019/0237779 A1 Aug. 1, 2019

(30) Foreign Application Priority Data
Jan. 26, 2018 (JP) .............................. JP2018-011081

(51) Int. Cl.
| | |
|---|---|
| *H01M 8/04119* | (2016.01) |
| *B60L 58/40* | (2019.01) |
| *H01M 8/04858* | (2016.01) |
| *H01M 8/04537* | (2016.01) |
| *H01M 8/04492* | (2016.01) |
| *H01M 8/04828* | (2016.01) |
| *H01M 8/0432* | (2016.01) |
| *H01M 8/04223* | (2016.01) |

(52) U.S. Cl.
CPC ......... *H01M 8/04156* (2013.01); *B60L 58/40* (2019.02); *H01M 8/0432* (2013.01); *H01M 8/0485* (2013.01); *H01M 8/0491* (2013.01); *H01M 8/0494* (2013.01); *H01M 8/04141* (2013.01); *H01M 8/04253* (2013.01); *H01M 8/04529* (2013.01); *H01M 8/04619* (2013.01); *H01M 2250/20* (2013.01)

(58) Field of Classification Search
CPC ......... H01M 8/04156; H01M 8/04141; H01M 8/0432; H01M 8/04529; H01M 8/04619; H01M 8/0485
See application file for complete search history.

(56) References Cited

U.S. PATENT DOCUMENTS

2003/0162063 A1* 8/2003 Yoshizawa ........ H01M 8/04225
429/413

FOREIGN PATENT DOCUMENTS

JP 2016-004630 1/2016

* cited by examiner

*Primary Examiner* — James Lee
(74) *Attorney, Agent, or Firm* — Amin, Turocy & Watson, LLP

(57) ABSTRACT

A fuel cell system includes a fuel cell, an accumulator configured to store a fuel gas, a gas remaining quantity acquisition unit configured to obtain a remaining quantity of the fuel gas stored in the accumulator, and a power generation control unit. When the remaining quantity of the fuel gas stored in the accumulator is decreased to a threshold value, the power generation control unit performs switching from humid power generation control to dry power generation control.

8 Claims, 5 Drawing Sheets

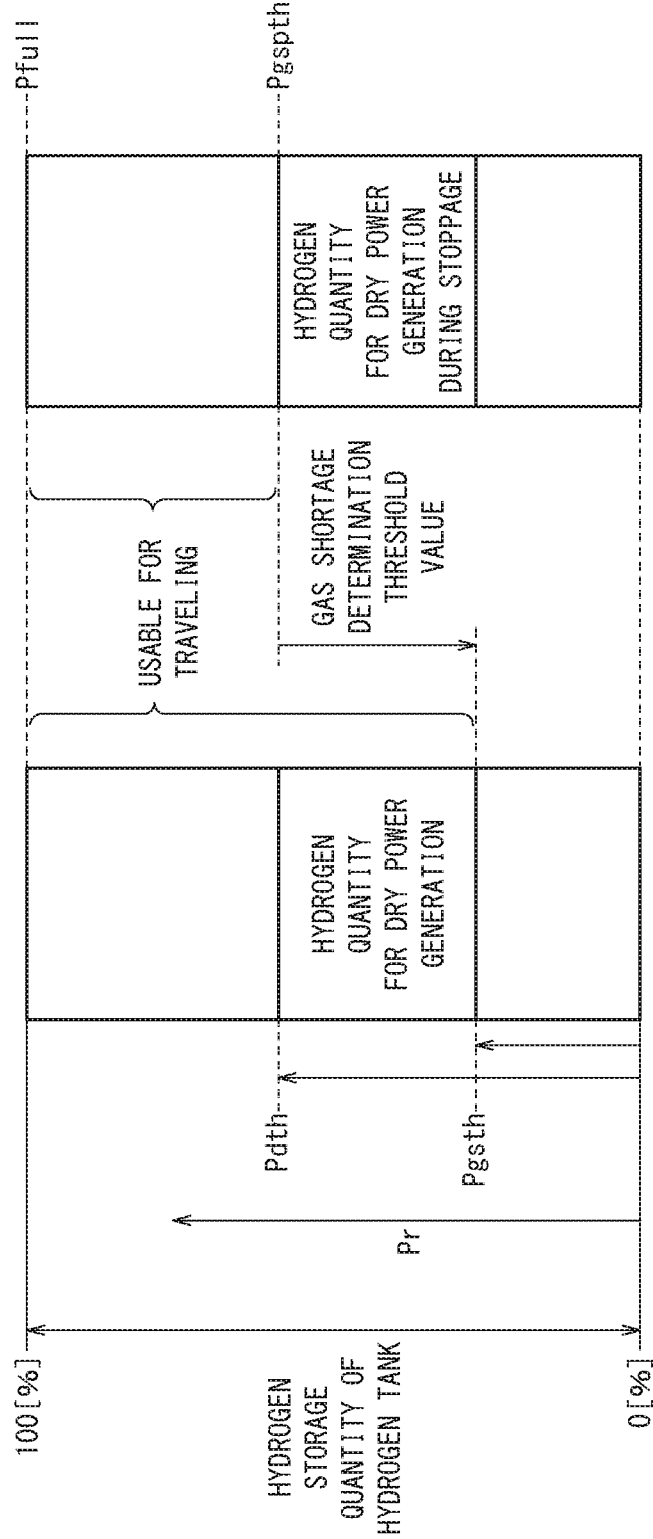

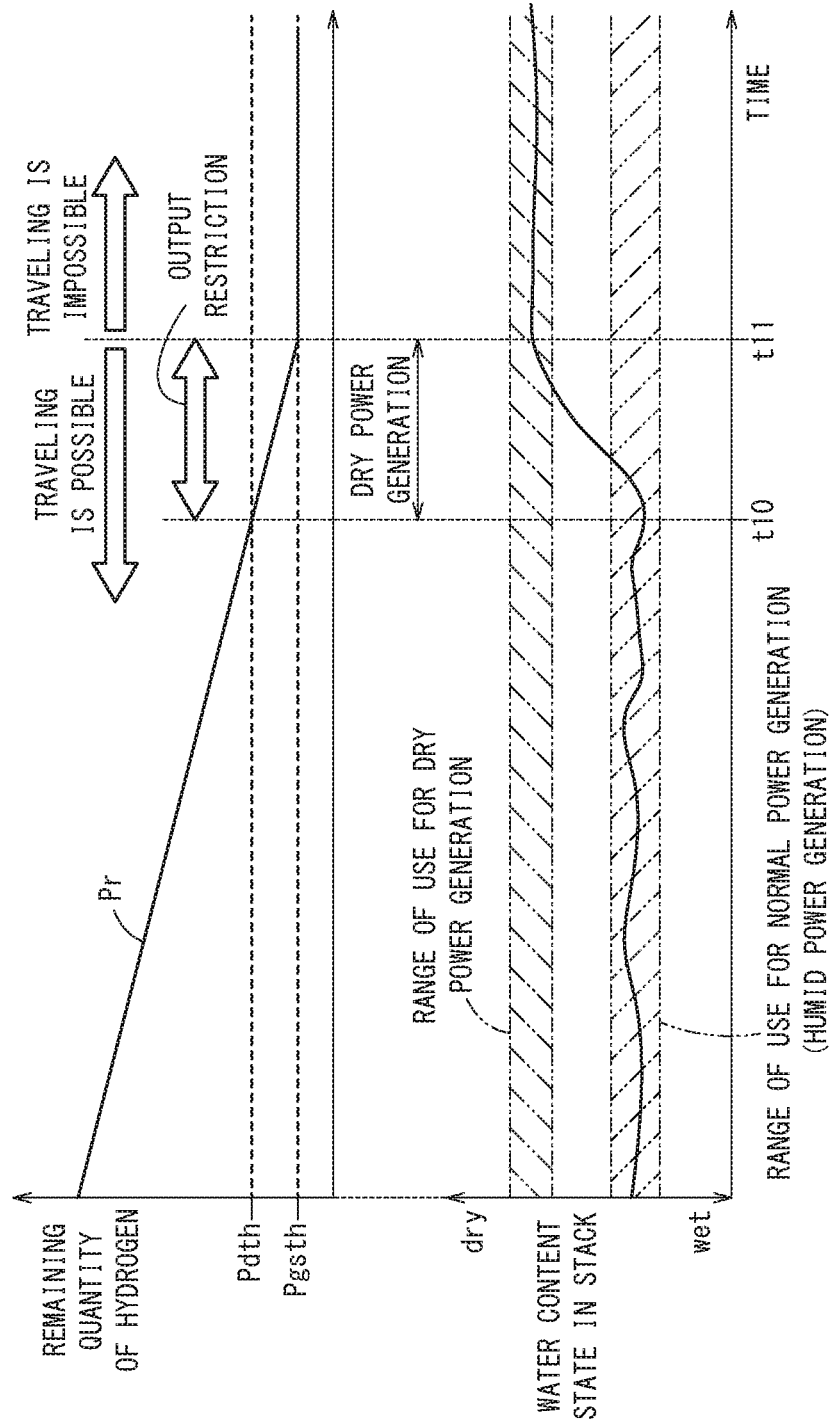

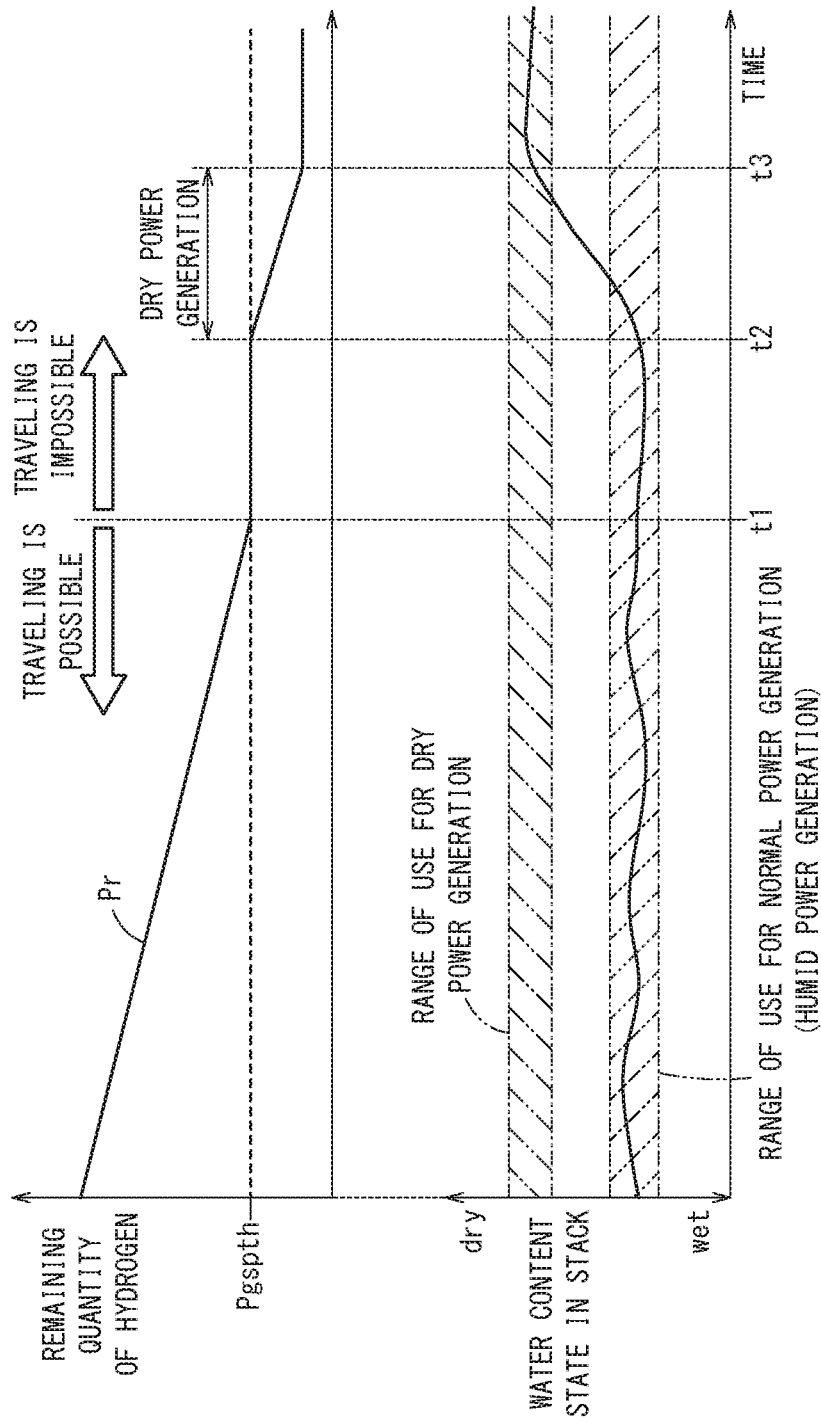
FIG. 5 (COMPARATIVE EXAMPLE)

FUEL CELL SYSTEM AND FUEL CELL VEHICLE

CROSS-REFERENCE TO RELATED APPLICATION

This application is based upon and claims the benefit of priority from Japanese Patent Application No. 2018-011081 filed on Jan. 26, 2018, the contents of which are incorporated herein by reference.

BACKGROUND OF THE INVENTION

Field of the Invention

The present invention relates to a fuel cell system and a fuel cell vehicle which perform dry power generation control in preparation for, e.g., starting operation at low temperatures the next time.

Description of the Related Art

For example, a solid polymer electrolyte fuel cell includes a membrane electrode assembly (MEA). The membrane electrode assembly includes an electrolyte membrane made of a polymer ion exchange membrane, an anode provided on one surface of the electrolyte membrane, and a cathode provided on the other surface of the electrolyte membrane. A power generation cell (a unit cell) is formed by sandwiching the membrane electrode assembly between separators. In general, a predetermined number of power generation cells are stacked together to form, e.g., an in-vehicle fuel cell stack mounted in a fuel cell vehicle (fuel cell electric automobile).

As described in Japanese Laid-Open Patent Publication No. 2016-004630 (hereinafter referred to as JPA2016-004630), in order to perform power generation efficiently in the fuel cell, it is required to maintain the MEA in a humid state (paragraph [0003] of JPA2016-004630).

However, at the time of stopping power generation of the fuel cell, if an excessive quantity of water is retained as stagnant water in the fuel cell, the stagnant water may hinder supply of hydrogen and/or air to the fuel cell, and it may be difficult to start operation of the fuel cell the next time. Further, the stagnant water is frozen below the freezing temperature. The decrease in the performance of starting operation due to such stagnant water becomes larger as the temperature at the time of starting operation becomes lower.

In this regard, in JPA2016-004630, a stop time power generation step is performed to continue power generation from when a stop instruction to the fuel cell is provided until a predetermined condition is satisfied. At the time of performing the stop time power generation step, the scavenging effect in a stoppage period scavenging step which will be performed in the future is estimated, and a target water content state at the time point when the stop time power generation step is completed is set using the result of this estimation. Then, in the stop time power generation step, power generation is continued to realize the set target water content state (paragraph [0019] of JPA2016-004630). According to the disclosure, the water content state of the membrane at the time of starting the next operation after scavenging has been performed in the stoppage period can be placed in a desired state for power generation all the time.

SUMMARY OF THE INVENTION

In order to perform dry power generation for regulating the quantity of the water content in the fuel cell vehicle, it is required that a quantity of hydrogen required for dry power generation during the stoppage period be left as a fuel in a hydrogen tank.

For this purpose, the fuel cell vehicle adopts, as a gas shortage (running out of fuel) determination threshold value, a value obtained by adding a quantity of hydrogen consumed in the stoppage period to a quantity of invalid hydrogen remaining in the hydrogen tank (hydrogen remaining quantity not enough to perform power generation of the fuel cell).

However, in the case of setting as the gas shortage determination threshold value the value obtained by adding the quantity of hydrogen consumed in the stoppage period, the quantity of hydrogen used for traveling becomes small accordingly.

The present invention has been made taking such a problem, and an object of the present invention is to provide a fuel cell system and a fuel cell vehicle in which it is possible to increase the quantity of hydrogen used for traveling while maintaining a desired start-up performance of starting operation the next time.

A fuel cell system according to an aspect of the present invention includes a fuel cell, an accumulator configured to store a fuel gas, a gas remaining quantity acquisition unit configured to obtain the remaining quantity of the fuel gas stored in the accumulator, and a power generation control unit. When the remaining quantity of the fuel gas stored in the accumulator is decreased to a threshold value, the power generation control unit is configured to perform switching from humid power generation control to dry power generation control.

In the present invention, when the remaining quantity of the fuel gas is decreased to the threshold value, the control is switched to the dry power generation control. Therefore, even in the case where the ambient temperature is decreased below the freezing temperature after stopping the fuel cell system, freezing of the fuel cell is avoided, and it is possible to suppress start-up failure at the time of starting operation the next time.

In this case, the fuel cell system may further include a temperature correlation acquisition unit configured to obtain a temperature correlation value of the fuel cell. In the case where the fuel cell system is stopped before the remaining quantity of the fuel gas is decreased to the threshold value, during a stoppage period after stopping the fuel cell system, when freezing of the fuel cell system is predicted based on the temperature correlation value, the power generation control unit may start operation of the fuel cell system and performs dry power generation control. The threshold value may be set to a value which is, at least, larger than a value obtained by adding a dry power generation consumption quantity for consumption in the dry power generation control during the stoppage period, to a gas shortage determination quantity at which it becomes impossible to perform power generation of the fuel cell.

As described above, since the dry power generation is performed only when necessary, in correspondence with the changing situations of the temperature at the time when the system is stopped, it is possible to suppress consumption of the fuel due to unnecessary dry power generation, and even if dry power generation is performed during the stoppage period after stopping the system, it is possible to ensure a sufficient quantity of the fuel gas for starting operation of the fuel cell the next time.

Preferably, the power generation control unit is configured to restrict output of the fuel cell system during the dry power generation control.

As described above, during the dry power generation control, since the output of the fuel cell system is restricted, it is possible to minimally suppress degradation of the fuel cell.

A fuel cell vehicle equipped with the fuel cell system is included in the present invention as well.

In the fuel cell vehicle according to the present invention, it is possible to maintain a desired cruising distance (driving range), and prevent freezing of the fuel cell. As a result, it is possible to improve the value of the fuel cell vehicle as a commercial product.

In the fuel cell system and the fuel cell vehicle according to the present invention, when the remaining quantity of the fuel gas is decreased to the threshold value, the control is switched to the dry power generation control. Therefore, even if the outside temperature is decreased below the freezing temperature after stopping the fuel cell system, freezing of the fuel cell is avoided, and it is possible to prevent start-up failure in starting operation the next time. In this case, in the fuel cell vehicle, it is possible to achieve the desired cruising distance (driving range), and improve the value of the fuel cell vehicle as a commercial product.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 3A and 3B are diagrams for illustrating a gas shortage determination threshold value, etc., in the embodiment and a comparative example;

FIG. 4 is a time chart illustrating dry power generation control according to the embodiment; and FIG. 5 is a time chart illustrating dry power generation control according to a comparative example.

DESCRIPTION OF THE PREFERRED EMBODIMENTS

Hereinafter, a preferred embodiment of a fuel cell system and a fuel cell vehicle according to the present invention will be described with reference to the accompanying drawings.
[Structure of Fuel Cell Vehicle 10 Equipped with Fuel Cell System 12]

Figure 1:
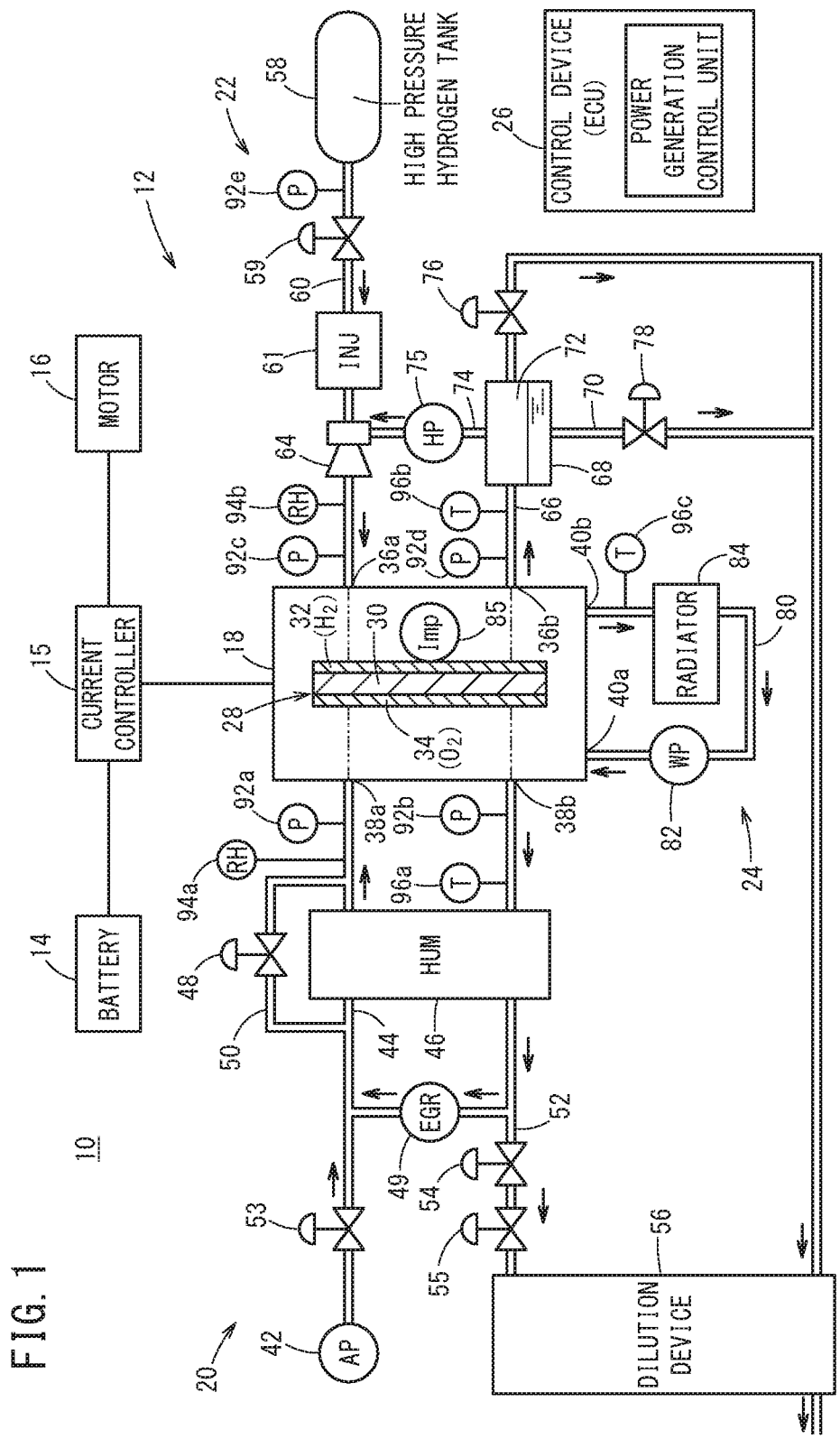
FIG. 1 is a diagram schematically showing structure of a fuel cell vehicle according to an embodiment of the present invention, equipped with a fuel cell system according to the embodiment.

As shown in FIG. 1, for example, a fuel cell vehicle 10 according to the embodiment is a fuel cell electric automobile. The fuel cell vehicle 10 includes a fuel cell system 12 according to the embodiment, a battery (energy storage device) 14, a current controller 15, and a motor (vehicle driving electric motor) 16. The battery 14 includes a secondary battery, a capacitor, etc.

The fuel cell system 12 includes a fuel cell stack (fuel cell) 18, an oxygen-containing gas supply apparatus 20, a fuel gas supply apparatus 22, a coolant supply apparatus 24, and a control device 26. The control device 26 comprises an ECU (Electronic Control Unit). The CPU executes programs stored in a memory to function as various control units.

The oxygen-containing gas supply apparatus 20 supplies an oxygen-containing gas to the fuel cell stack 18, the fuel gas supply apparatus 22 supplies a fuel gas to the fuel cell stack 18, and the coolant supply apparatus 24 supplies a coolant to the fuel cell stack 18. The control device 26 performs control of the entire fuel cell system 12 (each of the constituent elements), including control of a current controller 15 through a control line (not shown).

The fuel cell stack 18 is formed by stacking a plurality of power generation cells 28 together. Each of the power generation cells 28 includes an MEA including a solid polymer electrolyte membrane 30, and anode 32 and a cathode 34 on both sides of the solid polymer electrolyte membrane 30. For example, the solid polymer electrolyte membrane 30 is a thin membrane of perfluorosulfonic acid containing water. A fluorine based electrolyte may be used as the electrolyte membrane 30. Alternatively, an HC (hydrocarbon) based electrolyte may be used as the electrolyte membrane 30.

The output (electrical energy) of the fuel cell system 12, i.e., the output (electric energy) of the fuel cell stack 18 is supplied to a motor 16 through a current controller 15 under control of the control device 26, and the battery 14 can be charged with the electric energy.

In this case, power running/regeneration drive control for the motor 16, charging/discharging control for the battery 14, drive control for the auxiliary devices such as the air compressor 42 (an EGR pump 49, a hydrogen circulation pump 75, and a coolant pump 82), and power generation electrical energy control of the fuel cell stack 18 performed through the current controller 15 are performed under control of the control device 26. For the purpose of brevity, only power lines through which large electrical energy flows, i.e., power lines between the fuel cell stack 18 and the current controller 15, between the current controller 15 and the battery 14 and the motor 16 are illustrated.

The fuel cell stack 18 has a fuel gas supply passage 36a for supplying the fuel gas (such as a hydrogen-containing gas) to the anode 32, and a fuel gas discharge passage 36b for discharging the fuel gas from the anode 32.

The fuel cell stack 18 has an oxygen-containing gas supply passage 38a for supplying an oxygen-containing gas (such as the air) to the cathode 34, and an oxygen-containing gas discharge passage 38b for discharging the oxygen-containing gas from the cathode 34.

The fuel cell stack 18 has a coolant supply passage 40a and a coolant discharge passage 40b as passages of a coolant in each of the power generation cells 28.

The oxygen-containing gas supply apparatus 20 includes an air compressor (air pump) 42 for compressing the atmospheric air, and supplying the air. The air compressor 42 is provided in an air supply channel 44.

A humidifier 46, and a bypass channel 50 for bypassing the humidifier 46 through a valve 48 are provided in the air supply channel 44. The air supply channel 44 is connected to the oxygen-containing gas supply passage 38a of the fuel cell stack 18.

An air discharge channel 52 is connected to the oxygen-containing gas discharge passage 38b through the humidifier 46. An EGR (Exhaust Gas Recirculation) pump 49 is provided between the air discharge channel 52 and the air supply channel 44.

The EGR pump 49 recirculates some of the gas discharged from the oxygen-containing gas discharge passage 38b back to the oxygen-containing gas supply passage 38a.

An inlet stop valve 53 is provided on one side of the air compressor 42 where the air supply channel 44 is provided.

An outlet stop valve 54 is provided in the air discharge channel 52, and a dilution device 56 is connected to a position of the air discharge channel 52 downstream of the outlet stop valve 54 through a back pressure control valve 55.

The fuel gas supply apparatus 22 includes a high pressure hydrogen tank (accumulator) 58 for storing high pressure hydrogen, and the high pressure hydrogen tank 58 is connected to the fuel gas supply passage 36a of the fuel cell stack 18 through a hydrogen supply channel 60. In the hydrogen supply channel 60, a shutoff valve 59, an injector 61 and an ejector 64 for pressure regulation are provided in the order named in the flow direction of the hydrogen gas.

An off gas channel 66 is connected to the fuel gas discharge passage 36b of the fuel cell stack 18. The off gas channel 66 is connected to a gas liquid separator 68, and a drain channel 70 for discharging a liquid component and a gas channel 72 for discharging a gas component are provided in the gas liquid separator 68. The gas channel 72 is connected to the ejector 64 through a circulation channel 74 and a hydrogen circulation pump 75, and the gas channel 72 is connected to the dilution device 56 by operation of opening a purge valve 76. The drain channel 70 is connected to the dilution device 56 through a valve 78.

The dilution device 56 mixes the off gas (containing the hydrogen gas) discharged from the fuel gas discharge passage 36b of the fuel cell stack 18, and the off gas (containing the oxygen) discharged from the oxygen-containing gas discharge passage 38b of the fuel cell stack 18 to thereby dilute the gas so as to have hydrogen concentration of not more than a specified value.

The coolant supply apparatus 24 includes a coolant circulation channel 80 connected to the coolant supply passage 40a and the coolant discharge passage 40b of the fuel cell stack 18 for supplying the coolant in a circulating manner. In the coolant circulation channel 80, the coolant pump 82 is provided at a position adjacent to the coolant supply passage 40a, and a radiator 84 is provided at a position adjacent to the coolant discharge passage 40b.

The power generation cell 28 is provided with an impedance sensor 85 for measuring an impedance resistance value and electric potential.

Pressure gauges 92a, 92b, 92c, 92d, and 92e are provided at the air supply channel 44, the air discharge channel 52, the hydrogen supply channel 60, the off gas channel 66, and the outlet of the high pressure hydrogen tank 58, respectively. Hygrometers 94a, 94b are provided in the air supply channel 44 and the hydrogen supply channel 60, respectively. Thermometers 96a, 96b, 96c are provided in the air discharge channel 52, the gas channel 72, and the coolant circulation channel 80, respectively.

[Humid Power Generation Operation of Fuel Cell Vehicle 10 Equipped with Fuel Cell System 12]

Operation of the fuel cell vehicle 10 having the above structure will be described below.

The air (oxygen-containing gas) is supplied to the air supply channel 44 through the air compressor 42 of the oxygen-containing gas supply apparatus 20. After this air passes through the humidifier 46 and is humidified, or after the air passes through the bypass channel 50 to bypass the humidifier 46, the air is supplied to the oxygen-containing gas supply passage 38a of the fuel cell stack 18.

The humidifier 46 collects water contained in the oxygen-containing gas discharged from the oxygen-containing gas discharge passage 38b, and humidifies the air supplied from the air compressor 42 using the collected water. By the function of the humidifier 46, the solid polymer electrolyte membrane 30 of the fuel cell stack 18 during power generation is kept in a humid state (humidified state) suitable for power generation.

In the meanwhile, in the fuel gas supply apparatus 22, when the injector 61 is opened, the hydrogen gas (fuel gas) is supplied from the high pressure hydrogen tank 58 to the hydrogen supply channel 60. This hydrogen gas passes through the ejector 64, and then, the hydrogen gas is supplied to the fuel gas supply passage 36a of the fuel cell stack 18.

Further, in the coolant supply apparatus 24, by operation of the coolant pump 82, a coolant such as pure water, ethylene glycol, or oil is supplied from the coolant circulation channel 80 to the coolant supply passage 40a of the fuel cell stack 18.

The air is supplied from the oxygen-containing gas supply passage 38a to the cathode 34 of each of the power generation cells 28. In the meanwhile, the hydrogen gas is supplied from the fuel gas supply passage 36a to the anode 32 of each of the power generation cells 28. Therefore, in each of the power generation cells 28, the air supplied to the cathode 34 and the hydrogen gas supplied to the anode 32 are consumed in the electrochemical reactions in the electrode catalyst layers to generate electricity.

Then, the air supplied to and consumed at the cathode 34 is discharged into the oxygen-containing gas discharge passage 38b. The air flows through the air discharge channel 52, and flows into the dilution device 56. Likewise, the hydrogen gas supplied to and consumed at the anode 32 is discharged, as the off gas (the resulting gas after consumption of some of the fuel gas), into the fuel gas discharge passage 36b. After the off gas flows from the off gas channel 66 into the gas liquid separator 68 and the liquid water component is removed from the off gas, the off gas is suctioned into the ejector 64 from the gas channel 72 through the circulation channel 74.

Further, the coolant supplied to the coolant supply passage 40a cools each of the power generation cells 28, and then, the coolant is discharged from the coolant discharge passage 40b. The coolant flows through the coolant circulation channel 80, and is cooled by the radiator 84, and then, by operation of the coolant pump 82, the coolant is supplied to the fuel cell stack 18 in a circulating manner.

[Dry Power Generation Control Operation during Traveling of Fuel Cell Vehicle 10]

Figure 2:
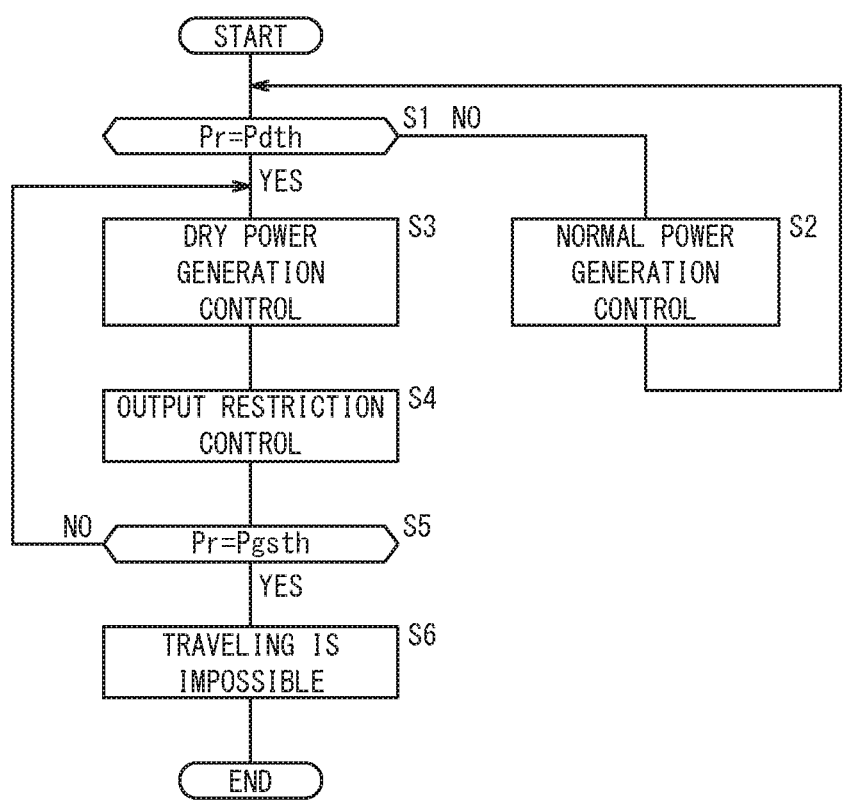
FIG. 2 is a flow chart illustrating operation of an operation control method of the fuel cell vehicle of an example in FIG. 1.

Next, an operation control method (dry power generation control operation) of the fuel cell vehicle 10 according to the embodiment of the present invention will be described with reference to a flow chart in FIG. 2.

For ease of understanding, the following description will be given with reference to the relationship between the gas remaining quantity Pr and the hydrogen storage quantity (0[%] to 100[%]: gas full quantity Pfull) of the high pressure hydrogen tank 58 according to a comparative example in FIG. 3B and an embodiment in FIG. 3A.

In step S1 during traveling where a power switch (not shown) of the fuel cell vehicle 10 is in an ON state, the control device 26 (power generation control unit) obtains the remaining gas quantity Pr, which is the remaining quantity of the fuel gas in the high pressure hydrogen tank 58, from a pressure value, etc. of the pressure gauge (gas remaining quantity acquisition unit) 92e.

Further, in step S1, it is determined whether or not the gas remaining quantity Pr has been decreased to a threshold value Pdth for starting dry power generation during traveling.

If the determination in step S1 (whether or not the gas remaining quantity Pr has been decreased to Pdth (Pr=Pdth)) is negative (Step S1: NO), since a sufficient gas remaining quantity Pr is still present, in step S2, normal power generation control (humid power generation control) where the valve 48 for bypassing the humidifier 46 is kept closed is performed.

On the other hand, in step S1, if it is determined that the gas remaining quantity Pr has been decreased to the threshold value Pdth for starting dry power generation during traveling (step S1: YES), in step S3, the valve 48 for bypassing the humidifier 46 is opened, and in the state where the valve 48 is opened, dry air from the air compressor 42 passes through the bypass channel 50, and the dry air is supplied into the fuel cell stack 18 through the oxygen-containing gas supply passage 38a to thereby start dry power generation control during traveling.

In this case, in step S4, the control device 26 limits an electric current supplied to the battery 14 and the motor 16 from the fuel cell stack 18 through the current controller 15, i.e., power generation electric current, to thereby suppress high load output during traveling in the dry power generation control, and prevent acceleration of degradation of the fuel cell stack 18.

Then, in step S5, the gas remaining quantity Pr is obtained, and it is determined whether the gas remaining quantity Pr which is being obtained has been decreased to a gas invalid remaining quantity threshold value (also referred to as an invalid hydrogen remaining quantity threshold value or a gas shortage determination quantity) Pgsth at which power generation can no longer be performed in the fuel cell stack 18.

In the process of step S3, step S4, and step S5: NO, i.e., during continuation of the dry power generation control, the fuel cell vehicle 10 stops traveling, and a power switch (not shown) is placed in an OFF state. After the power switch is placed in the OFF state, in step S3, the control is switched to dry power generation control during stoppage (which is sometimes referred to as "soaking"), and in step S4, the output is further restricted.

At step S5 in dry power generation control during the stoppage, in the case where the gas remaining quantity Pr has been decreased to the gas invalid remaining quantity threshold value Pgsth (step S5: YES), in step S6, the fuel cell vehicle 10 is placed in a traveling stop state where traveling is impossible.

It should be noted that the so-called gas shortage indication lamp is turned on when the gas remaining quantity Pr decreases to a value slightly larger than the threshold value Pdth for starting dry power generation shown in FIG. 3A.

SUMMARY

In the fuel cell vehicle 10 equipped with the fuel cell system 12 according to the embodiment of the present invention, as shown in FIG. 3A, during traveling, when the gas remaining quantity of the fuel gas stored in the high pressure hydrogen tank 58 (hydrogen storage quantity of the high pressure hydrogen tank 58) Pr is decreased, e.g., from the full filling quantity (100[%]) to the threshold value (threshold value for starting dry power generation during traveling) Pdth, since the control is switched to dry power generation control and traveling is continued, the fuel cell stack 18 is dried. Therefore, even if the ambient temperature is decreased below the freezing temperature after operation of the fuel cell system 12 has been stopped, freezing of the fuel cell stack 18 is avoided, and it is possible to prevent start-up failure at the time of starting operation the next time.

As described above, in the embodiment of the present invention, in comparison with the gas shortage determination threshold value Pgspth of the comparative example in FIG. 3B, in the threshold value Pdth for starting dry power generation during traveling, the quantity of hydrogen (for dry power generation during stoppage in FIG. 3B) which would be consumed during stoppage in the comparative example (FIG. 3B) is added, as the quantity of hydrogen which can be used for dry power generation during traveling according to the embodiment in FIG. 3A, to the invalid hydrogen remaining quantity threshold value Pgsth. Therefore, dry power generation during stoppage becomes unnecessary, and it becomes possible to increase the quantity of hydrogen which can be used for traveling.

That is, since the dry power generation control in preparation for starting operation at low temperature the next time and traveling are performed concurrently, it is possible to secure a sufficient gas remaining quantity Pr for traveling, and extend the cruising distance. In effect, it is possible to consider that the gas shortage determination threshold value is decreased from the gas shortage determination threshold value Pgspth (comparative example) to the invalid remaining quantity threshold value Pgsth (embodiment) (FIG. 3A, FIG. 3B).

FIG. 4 is a time chart illustrating the embodiment of the present invention. FIG. 5 is a time chart illustrating the comparative example.

In the comparative example shown in FIG. 5, at the time point t1, when the gas remaining quantity Pr is decreased to the gas shortage determination threshold value Pgspth, the fuel cell vehicle stops traveling, and the stoppage state is started. In the period from the time point t2 to the time point t3, dry power generation is performed. The water content state in the fuel cell stack 18 is under the humid power generation control (humid control state) in the normal usage range until the time point t2, and changed from the humid power generation control (humid control state) to the dry power generation control (dry control state) during a period from the time point t2 to the time point t3.

It should be noted that the quantity of hydrogen which would be consumed in dry power generation (the time point t2 to the time point t3) during stoppage may be a predetermined quantity. Alternatively, the quantity of hydrogen may be set variably based on the water content state in the stack (water content quantity in the stack) detected by the hygrometers 94a, 94b, or based on an estimated value of the water content state in the stack. For example, as a result of comparison between the target water content state in the stack within a range of use for dry power generation (FIG. 5) and the current water content state in the stack, the quantity of hydrogen which is required to reach the target water content state in the stack may be set as a quantity of hydrogen which would be consumed during stoppage.

On the other hand, in the embodiment shown in FIG. 4, at the time point t10 during traveling, when the gas remaining quantity Pr becomes less than a threshold value Pdth for starting dry power generation during traveling (Pdth≈Pgspth>Pgsth), dry power generation is started, and output restriction is performed. Thus, during the period from the time point t10 to the time point t11, the humid power generation control is switched to the dry power generation control (dry control state). During dry power generation from the time point t10 to the time point t11, the output of the fuel cell stack 18 is restricted through the current controller 15, and acceleration of degradation of the fuel cell stack 18 due to the dry power generation is suppressed.

Modified Embodiment

In a case where, before the time point t10 in FIG. 4, i.e., before the gas remaining quantity Pr is decreased to the threshold value Pdth for starting dry power generation during traveling, the power switch of the fuel cell system 12 is placed in the OFF state, whereby the fuel cell system 12 is stopped, during the stoppage period after stopping the fuel cell system 12, it is predicted whether or not the fuel cell stack 18 will be frozen, based on the temperature detected by the thermometer (temperature correlation value acquisition unit) 96a. If freezing of the fuel cell stack 18 is predicted, operation of the fuel cell system 12 is started, and the dry power generation control during stopping is performed.

It should be noted that the threshold value Pdth for starting dry power generation during traveling is set to the quantity obtained by at least adding the quantity of dry power generation consumption for the dry power generation control during the stoppage period (dry power generation consumption quantity) to the gas shortage determination quantity Pgsth at which it becomes impossible to perform power generation of the fuel cell stack 18 {Pdth≥(Pgsth+dry power generation consumption quantity)}.

As shown in the modified embodiment, in correspondence with the changing conditions of the temperature at the time of stopping the system, since the dry power generation is performed only when necessary, it is possible to suppress consumption of hydrogen due to unnecessary dry power generation, and even if dry power generation is performed during the stoppage period after stopping, it is possible to ensure a sufficient quantity of the fuel gas for starting operation the next time.

It should be noted that the present invention is not limited to the above described embodiments. It is a matter of course that various structures may be adopted.

What is claimed is:

1. A fuel cell system comprising:
a fuel cell;
an accumulator configured to store a fuel gas;
a gas remaining quantity acquisition unit configured to obtain a remaining quantity of the fuel gas stored in the accumulator; and
a power generation control unit programmed to:
determine that the remaining quantity of the fuel gas stored in the accumulator has decreased to a threshold value, during humid power generation control while a power switch is in an ON state, and
perform switching from the humid power generation control to dry power generation control in response to the remaining quantity of the fuel gas stored in the accumulator decreasing to the threshold value.

2. The fuel cell system according to claim 1, further comprising a temperature correlation acquisition unit programmed to obtain a temperature correlation value of the fuel cell,
wherein the power switch is placed in an OFF state to stop the fuel cell system before the remaining quantity of the fuel gas is decreased to the threshold value, during a stoppage period after stopping the fuel cell system, and wherein the power generation control unit is further programmed to start operation of the fuel cell system and perform dry power generation control in response to a prediction that the fuel cell will freeze based on the temperature correlation value, and wherein the threshold value is set to a value which is, at least, larger than a value obtained by adding a dry power generation consumption quantity for consumption in the dry power generation control during the stoppage period, to a gas shortage determination quantity at which it becomes impossible to perform power generation of the fuel cell.

3. The fuel cell system according to claim 1, wherein the power generation control unit is programmed to restrict output of the fuel cell system during the dry power generation control.

4. The fuel cell system according to claim 1, wherein the threshold value is set to a value which is, at least, larger than a value obtained by adding a dry power generation consumption quantity for consumption in the dry power generation control during the stoppage period, to a gas shortage determination quantity at which it becomes impossible to perform power generation of the fuel cell.

5. A fuel cell vehicle configured to travel by output of a fuel cell system supplied to a motor;
the fuel cell system comprising:
a fuel cell;
an accumulator configured to store a fuel gas;
a gas remaining quantity acquisition unit configured to obtain a remaining quantity of the fuel gas stored in the accumulator; and
a power generation control unit programmed to:
determine, during traveling of the fuel cell vehicle, that the remaining quantity of the fuel gas stored in the accumulator has decreased to a threshold value, during humid power generation control while a power switch is in an ON state, and
perform switching from the humid power generation control to dry power generation control in response to the remaining quantity of the fuel gas stored in the accumulator decreasing to the threshold value.

6. The fuel cell vehicle according to claim 5, wherein the fuel cell system further comprises a temperature correlation acquisition unit programmed to obtain a temperature correlation value of the fuel cell; and
wherein the power switch is placed in an OFF state to stop the fuel cell system before the remaining quantity of the fuel gas is decreased to the threshold value, during a stoppage period after stopping the fuel cell system, and wherein the power generation control unit is further programmed to start operation of the fuel cell system and perform dry power generation control; and
wherein the threshold value is set to a value which is, at least, larger than a value obtained by adding a dry power generation consumption quantity for consumption in the dry power generation control during the stoppage period, to a gas shortage determination quantity at which it becomes impossible to perform power generation of the fuel cell.

7. The fuel cell vehicle according to claim 5, wherein the power generation control unit is programmed to restrict the output of the fuel cell system during the dry power generation control.

8. The fuel cell vehicle according to claim 5, wherein the threshold value is set to a value which is, at least, larger than a value obtained by adding a dry power generation consumption quantity for consumption in the dry power generation control during the stoppage period, to a gas shortage determination quantity at which it becomes impossible to perform power generation of the fuel cell.

* * * * *